United States Patent
Yoo et al.

(10) Patent No.: US 11,511,520 B2
(45) Date of Patent: Nov. 29, 2022

(54) COMPOSITE MATERIAL IN WHICH STEEL SHEET AND PLASTIC LAYER HAVING FUNCTIONAL GROUP INTRODUCED THEREIN ARE LAMINATED, AND METHOD FOR PRODUCING SAME

(71) Applicant: POSCO, Pohang-si (KR)

(72) Inventors: Hye Jin Yoo, Busan (KR); Kangmin Lee, Seoul (KR); Jehoon Baek, Suncheon-si (KR); Jung-Su Kim, Gwangyang-si (KR); Chang-Se Byeon, Gwangyang-si (KR)

(73) Assignee: POSCO Co., Ltd, Pohang-si (KR)

( * ) Notice: Subject to any disclaimer, the term of this patent is extended or adjusted under 35 U.S.C. 154(b) by 0 days.

(21) Appl. No.: 16/956,221

(22) PCT Filed: Oct. 17, 2018

(86) PCT No.: PCT/KR2018/012290
§ 371 (c)(1),
(2) Date: Jun. 19, 2020

(87) PCT Pub. No.: WO2019/124702
PCT Pub. Date: Jun. 27, 2019

(65) Prior Publication Data
US 2021/0078291 A1    Mar. 18, 2021

(30) Foreign Application Priority Data
Dec. 21, 2017    (KR) .......................... 10-2017-0177109

(51) Int. Cl.
*B32B 7/12*    (2006.01)
*B32B 15/088*    (2006.01)
(Continued)

(52) U.S. Cl.
CPC .............. *B32B 15/088* (2013.01); *B32B 7/12* (2013.01); *B32B 15/18* (2013.01); *B32B 27/16* (2013.01);
(Continued)

(58) Field of Classification Search
CPC ....... B32B 15/08; B32B 15/088; B32B 15/18; B32B 2250/02; B32B 2250/03;
(Continued)

(56) References Cited

U.S. PATENT DOCUMENTS 8,431,225 B2    4/2013    Imai et al.
2010/0197882 A1    8/2010    Imai et al.
(Continued)

FOREIGN PATENT DOCUMENTS

JP    2000037812    2/2000
JP    2003171510    6/2003
(Continued)

OTHER PUBLICATIONS

European Search Report—European Application No. 13892225.6 dated Dec. 20, 2021, citing KR 2017-0080487, US 2010-0197832, JP 2003-277951, US 2011-0008644, and US 2016-0229116.
(Continued)

*Primary Examiner* — Lawrence D Ferguson
(74) *Attorney, Agent, or Firm* — Cantor Colburn LLP

(57) ABSTRACT

A composite material comprising a plastic layer; and a steel sheet laminated on one side or both sides of the plastic layer,
(Continued)

and having a structure in which plastic particles are introduced onto the surface of the side where the plastic layer is laminated with the steel sheet and a method for producing the same are provided, wherein the composite material is capable of being used as automotive parts or structures, and the like.

7 Claims, 2 Drawing Sheets

(51) Int. Cl.
*B32B 15/18* (2006.01)
*B32B 27/16* (2006.01)
*B32B 27/34* (2006.01)
*B32B 37/06* (2006.01)
*B32B 37/10* (2006.01)

(52) U.S. Cl.
CPC .............. *B32B 27/34* (2013.01); *B32B 37/06* (2013.01); *B32B 37/10* (2013.01); *B32B 2310/0481* (2013.01); *B32B 2310/0831* (2013.01); *B32B 2605/00* (2013.01)

(58) Field of Classification Search
CPC ............ B32B 2250/40; B32B 2255/06; B32B 2255/26; B32B 2307/538; B32B 2310/0481; B32B 2310/0831; B32B 2605/00; B32B 27/16; B32B 27/34; B32B 37/06; B32B 37/10; B32B 7/12
See application file for complete search history.

(56) References Cited

U.S. PATENT DOCUMENTS

| | | |
|---|---|---|
| 2011/0008644 A1 | 1/2011 | Naritomi et al. |
| 2016/0229116 A1 | 8/2016 | Nakamura et al. |
| 2016/0318294 A1 | 11/2016 | Kluppel et al. |

FOREIGN PATENT DOCUMENTS

| | | |
|---|---|---|
| JP | 2003277951 | 10/2003 |
| JP | 2004277876 | 10/2004 |
| JP | 2010173274 | 8/2010 |
| JP | 4903897 | 1/2012 |
| JP | 2015066938 | 4/2015 |
| JP | 2015196878 | 11/2015 |
| JP | 6210703 | 10/2017 |
| KR | 101571852 | 11/2015 |
| KR | 20170080487 | 7/2017 |

OTHER PUBLICATIONS

International Search Report—PCT/KR2018/012290 dated Jan. 24, 2019.
Japanese Office Action—Japanese Application No. 2020-534939 dated Jun. 29, 2021, citing JP 2000-37812, JP 2015-196878, JP 2004-277876, JP 2003-171510, JP 62-10703, and JP 2010-173274.

COMPOSITE MATERIAL IN WHICH STEEL SHEET AND PLASTIC LAYER HAVING FUNCTIONAL GROUP INTRODUCED THEREIN ARE LAMINATED, AND METHOD FOR PRODUCING SAME

TECHNICAL FIELD

The present invention relates to a composite material laminated by a steel sheet and a plastic layer with functional groups introduced, and a method for producing the same.

Background Art

Over the past 20 years, an excessive energy use problem has become a conversation topic, and there are active movements to lighten materials throughout the industry to reduce energy use. Environmental pollution problems caused by the serious use of energy and concerns about depletion of energy resources due to rapid increase in automobile demand have been intensified. Accordingly, active research has been conducted on lightening of materials, and the used amount of lightweight materials such as aluminum has been also increased every year.

In particular, in the automotive industry, the weight reduction of automobile materials is a long-standing concern and a next-generation development goal for all automobile companies. World-renowned automobile manufacturers, and companies related to parts and materials are engaged in fierce technological competition with the aim of producing automobiles with high fuel efficiency through development and adoption of new materials for lightening of automobiles.

Among lightweight materials, aluminum is widely used as an automotive material of non-ferrous materials, and especially, the ratio applied for automotive exterior panels increases. However, there is a problem that aluminum consumes a lot of energy in the processing steps and is disadvantageous in terms of price.

A high-strength steel sheet with a thin thickness has emerged as a corresponding material for aluminum. When the high-strength steel sheet is used, there is a problem that the thickness becomes thin and simultaneously the outer plate stiffness is insufficient. In addition, the high-strength steel sheet with a predetermined thickness or less has a limitation that fine wrinkles or spring back phenomena occurs during processing steps.

As an alternative, a lightweight sandwich steel sheet, in which a light polymer layer having adhesive properties is inserted between steel sheets, has been studied. However, in the composite steel sheet in the form of inserting such a plastic layer, a process of laminating after applying an adhesive or laminating after plasma treatment on the surface of the steel sheet for bonding the plastic layer and the steel sheet or the like is performed for bonding the plastic layer and the steel sheet. However, the method of applying the adhesive has a problem that harmful substances occur or the interface is opened according to processing or temperature changes, and the method of treating the plasma on the surface of the steel sheet has a limitation that sufficient adhesion force between the plastic layer and the steel sheet is not secured.

PRIOR ART DOCUMENTS

US Patent Application Publication No. 2016-0318294

DISCLOSURE

Technical Problem

The present invention is intended to provide a lightweight composite material providing sufficient adhesion force between a steel sheet and a plastic layer by introducing polar functional groups through surface modification of the plastic layer and a method for producing the same.

Technical Solution

In one example, the present invention provides a composite material comprising:
a plastic layer; and
a steel sheet laminated on one side or both sides of the plastic layer, and
having a structure that polar functional groups are introduced onto the surface of the plastic layer in contact with the steel sheet.

In another example, a method for producing a composite material is provided, which comprises steps of surface-modifying one side or both sides of a plastic layer with polar functional groups; and
laminating a steel sheet on the surface-modified surface of the plastic layer under heating or pressing conditions.

Advantageous Effects

The composite material according to the present invention introduces polar functional groups onto a surface of a plastic layer, thereby providing sufficient adhesion force between a steel sheet and the plastic layer and being capable of being used as automotive parts or automotive structures, and the like.

BEST MODE

Figure 1:
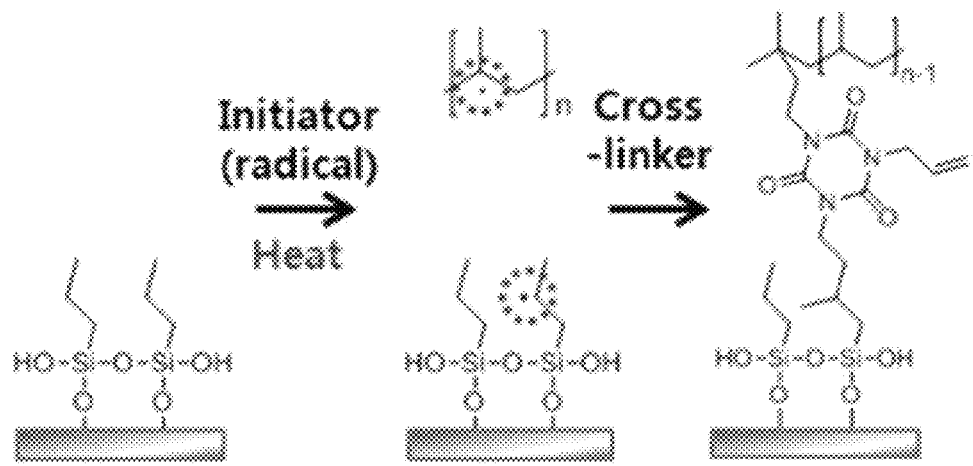
FIG. 1 is a schematic diagram showing a process of introducing polar functional groups on a surface of a plastic layer.

The composite material according to one example of the present invention comprises:
a plastic layer; and
a steel sheet laminated on one side or both sides of the plastic layer, and has
a structure that polar functional groups are introduced onto the surface of the plastic layer in contact with the steel sheet.

The composite material according to the present invention uses a thin high-strength steel sheet, thereby imparting dent resistance and being capable of securing excellent price competitiveness. Through the structure that the steel sheet and the plastic layer are laminated, the outer plate stiffness according to the use of the thin steel sheet is complemented and the lightening is possible. In addition, by laminating the thin high-strength steel sheet and the plastic layer, it is possible to prevent a phenomenon of fine wrinkles or spring back, and the like caused by the processing steps. The structure of the composite material is a two-layer structure that a steel sheet and a plastic layer are laminated, or includes the case of a three-layer structure that a steel sheet, a plastic layer and a steel sheet are sequentially laminated.

In the present invention, a structure that polar functional groups are introduced onto a surface of a plastic layer is applied to increase bonding force between the steel sheet and the plastic layer. The polar functional group has a meaning in contrast to a non-polar functional group, which can be interpreted as a hydrophilic functional group. The polar functional group comprises, for example, one or more of a hydroxy group (—OH), a carboxy group (—COOH), a carbonyl group (—CO—), an amino group (—NH$_2$), a hydroperoxy group (—OOH), a peroxy group (—OO—), a thiol group (—SH) and an isocyanate group (—NCO).

Furthermore, in the present invention, the material applied to the plastic layer is formed of an engineering plastic. The engineering plastic generically means high-strength plastics used as industrial materials and structural materials. The engineering plastic has a concept distinct from conventional plastics, which are low-molecular materials having a molecular weight of several tens to several hundreds, in that it is high-molecular materials having a molecular weight ranging from hundreds of thousands to several millions. The performance and characteristics of engineering plastics vary depending on the chemical structure, where mainly polyamide, polyacetyl, polycarbonate, polyphenylene oxide, polybutylene terephthalate, and the like are included, and polyethylene, polypropylene, polyester or polyurethane, and the like are also included. For example, the polyamide resin has excellent surface hardness, bending strength and alkali resistance, and nylon 6 or nylon 66, and the like are known.

In another example, the composite material according to the present invention does not require a separate adhesive layer on the lamination of the steel sheet and the plastic layer. The surface of the plastic layer is in a state modified to introduce polar functional groups, where the polar functional groups introduced onto the surface of the plastic layer imparts bonding force with the steel sheet. Therefore, even if a separate adhesive layer is not formed for lamination between the steel sheet and the plastic layer, a composite material having excellent bonding force can be realized.

In addition, the composite material according to the present invention is capable of lightening the material by laminating the plastic layer on one side of the steel sheet or between the steel sheet and the steel sheet. For example, the thickness ratio of the plastic layer and the steel sheet laminated to the plastic layer may be in a range of 3:1 to 1:5, or in a range of 2:1 to 1:2. By controlling the thickness of the steel sheet and the plastic layer to the above range, it is possible to simultaneously realize rigidity and lightening of the composite material.

In another example, the surface of the steel sheet applied to the composite material according to the present invention may have a structure that plastic fine particles are dispersed. For example, the steel sheet surface of the side in contact with the plastic layer has a structure that plastic particles are dispersed.

In one example, the plastic layer and the plastic particles are formed of a homogeneous resin. For example, the plastic layer is formed of a polyamide resin, specifically, nylon 6 resin, and the plastic particles also have a structure formed of the homogeneous resin. By making the kind of the resins forming the plastic layer and the plastic particles dispersed on the surface of the steel sheet the same, it is possible to realize excellent bonding force between the homogeneous resins in the process of bonding both layers under heating and pressing conditions. In the present invention, the homogeneous resin means a case formed of the same series resins, where if necessary, the case that the main chain forming the resin is the same, but different functional groups can be substituted or partially modified, or the case that the melting point is set differently is included.

In one example, the surface of the steel sheet in contact with the plastic layer has a structure in which a plated layer is formed, the plastic particles are in a form dispersed on the surface of the plated layer, and the surface of the plated layer has arithmetic mean roughness (Ra) in a range of 0.01 to 5 μm. The plated layer is not particularly limited, but, for example, a galvanized layer may be formed. Specifically, the surface of the plated layer may have arithmetic mean roughness (Ra) in the range of 0.01 to 4 μm, 0.1 to 0.8 μm, or 0.05 to 0.5 μm. As the fine plastic particles are dispersed on the plated layer having a certain level of roughness, the binding force between the plated layer and the fine plastic particles can be increased, and furthermore, the bonding force between the steel plate and the plastic layer can be improved. In one example, the steel sheet on which the plated layer is formed may be a galvanized steel sheet, which is, for example, a hot-dip galvanized steel sheet hot-dipped with a plating composition of 0.11Al %-0.05 Pb %-Zn.

In addition, the average particle diameter of the plastic particles is in a range of 0.2 to 50 μm. Specifically, the average particle diameter of the plastic particles may be in the range of 0.2 to 0.5 μm, or 15 to 30 μm. The particle diameter of the plastic particles is taken into consideration of the roughness of the surface of the steel sheet. When the plastic particles are too large compared to the roughness of the surface of the steel sheet, the plastic particles are not properly seated between the bends of the surface of the steel sheet, thereby causing a problem that the steel sheet and the plastic particles are separated or the bonding force is lowered. Conversely, when the plastic particles are too small, there is a problem that an agglomeration phenomenon occurs due to interaction between the particles, and the particles are not evenly dispersed on the surface of the steel sheet.

In the present invention, the roughness of the steel sheet surface means not only the surface roughness of the steel sheet itself, but also the surface roughness formed by a plated layer when the plated layer is formed on the surface of the steel sheet.

The steel sheet is in the case where a galvanized layer is formed thereon, wherein the plastic particles are located in the valley portions between the peaks and the peaks formed on the surface of the galvanized layer. Through this, the steel sheet and the plastic particles are stably bonded. Furthermore, the polar functional groups introduced on the surface of the plastic layer can realize excellent bonding force through binding force with the plated layer or plastic particles. For example, when the particle diameter of the plastic particles is too large compared to the roughness of the steel sheet surface, the plastic particles do not settle in the rough region of the steel sheet surface. Conversely, when the particle diameter of the plastic particles is too small compared to the surface roughness of the steel sheet, due to interaction between the particles, the plastic particles agglomerate to each other to form clusters, and the plastic particles forming the clusters do not settle in the rough region of the steel sheet surface.

In one example, the case where in addition to the plastic particles, one or more of conductive particles and elastic particles are mixed and dispersed on the surface of the steel sheet in contact with the plastic layer is included. By partially mixing the conductive particles among the particles dispersed on the surface of the steel sheet, weldability of the composite material can be increased, and if necessary, antistatic performance can be imparted. In addition, by mixing and dispersing the elastic particles together with the plastic particles, it is possible to alleviate the impact on vibration and improve the degree of freedom of process.

The conductive particles can be applied without limitation as long as they are particulate components that can impart conductivity. For example, as the conductive particles, one or more of a particulate carbon component such as carbon black, graphite, or graphene plates; metal particles such as gold, copper, iron or aluminum; and a conductive polymer such as polyethylene, polypyrrole or polythiophene may be used, wherein the conductive polymer may have a structure doped with various components as necessary.

The elastic particles can be applied without limitation as long as they are particulate components capable of imparting elasticity. As the elastic particles, a natural or synthetic elastic polymer may be used, and for example, SBS (poly (styrene-b-butadiene-b-styrene) resin particles and the like may be used.

Although the application field of the composite material according to the present invention is not particularly limited, it can be applied, for example, as automotive materials. Materials applied in the automotive field require light weight properties, processability and rigidity at the same time. The composite material according to the present invention can realize lightweight properties and rigidity together by laminating the steel sheet and the plastic layer. In addition, since the composite material has high bonding force between the steel sheet and the plastic layer, the separation phenomenon between layers can be prevented in the processing steps. The composite material according to the present invention is applicable, for example, to automotive parts or automotive structures, and the like.

In addition, the present invention provides a method for producing the composite material described above.

In one example, the method for producing the composite material comprises steps of:

surface-modifying one side or both sides of a plastic layer with polar functional groups; and laminating a steel sheet on the surface-modified surface of the plastic layer under heating or pressing conditions.

The step of surface-modifying a plastic layer is not particularly limited as long as polar functional groups can be introduced onto the surface of the plastic layer, which is performed through any one or more processes of, for example, UV treatment, ozone treatment, radical reaction, graft reaction and cross-linker treatment.

For example, the main chain of the polymer is cut (chain scission) by irradiating the surface of the plastic layer with UV or hydrophilicity is imparted to the surface of the plastic layer through ozone treatment. In some cases, it is also possible to modify the surface of the plastic layer by treating a radical initiator and/or a cross-linker. FIG. 1 is a schematic diagram showing a process of surface-modifying a plastic layer according to one example. Referring to FIG. 1, the surface is modified by applying heat to the surface of the plastic layer and simultaneously treating the radical initiator, and then adding a cross-linker thereto. As another surface modification method, a low molecular weight resin having polar functional groups may be applied on one side or both sides of a high molecular weight plastic layer or the resin layer may be laminated. By forming the low molecular weight resin layer, it is possible to increase the number of polar functional groups formed at the terminals relative to the same mass.

In another example, in the method for producing a composite material according to the present invention, the step of surface-modifying one side or both sides of a plastic layer with polar functional groups; and the step of laminating a steel sheet to the surface-modified surface of the plastic layer may be performed continuously. By continuously performing the step of surface-modifying one side or both sides of the plastic layer with polar functional groups; and the step of laminating the steel sheet on the surface-modified surface of the plastic layer, the process time can be shortened and the production unit price can be lowered. In this case, the case where one steel sheet and a plastic layer are laminated is also possible, but the case where the first steel sheet and the second steel sheet are laminated on both sides of the plastic layer is also included. In the present invention, the fact that the step of surface-modifying one side or both sides of a plastic layer with polar functional groups; and the step of laminating a steel sheet on the surface-modified surface of the plastic layer are performed continuously means that after the step of surface-modifying one side or both sides of a plastic layer with polar functional groups, the step of laminating a steel sheet on the surface-modified surface of the plastic layer is connected and performed, which shows that the process of forming a separate adhesive layer between both steps or applying an adhesive resin is not performed.

In some cases, the steel sheet is in a form that plastic particles having an average particle diameter in a range of 10 to 50 μm are sprayed on the surface of the steel sheet laminated with the plastic layer. The plastic particles sprayed on the surface of the steel sheet are as described above. For example, nylon 6 may be used as the resin for forming plastic particles. The plastic particles may be prepared by dropping and stirring the solution phase in which the nylon 6 resin is mixed with a solvent of formic acid in water. In addition to the formic acid, methanol, ethanol or acetone, and the like may be used as the solvent. In some cases, it is also possible to commercially purchase plastic particles having an appropriate particle diameter. The prepared plastic particles are sprayed on the surface of the steel sheet, for example, through an electrostatic spraying method.

Figure 2:
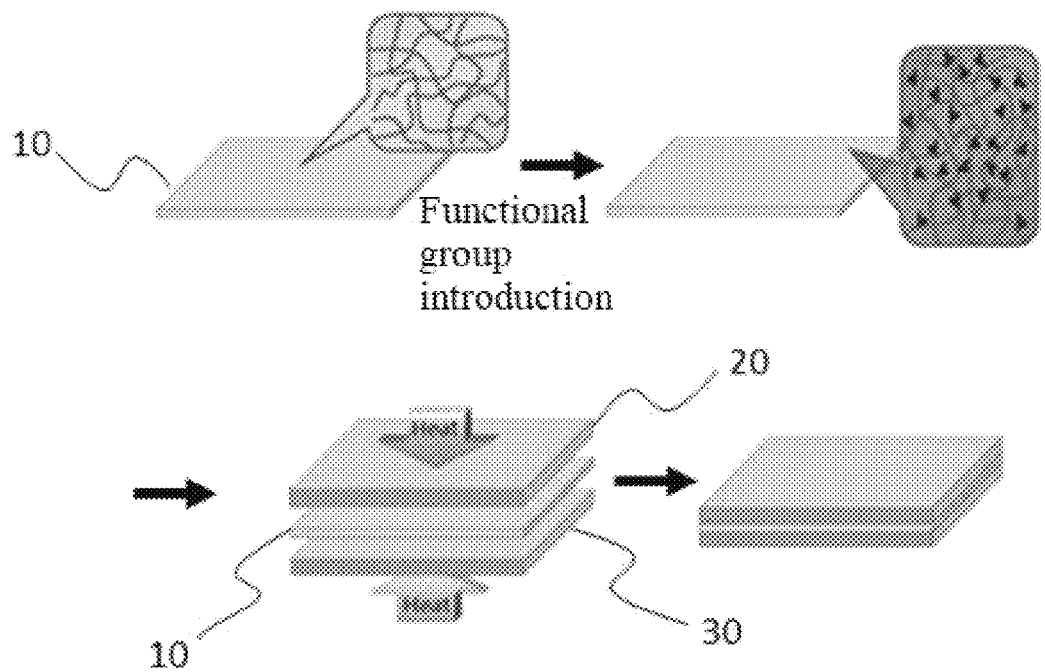
FIG. 2 is a schematic diagram showing a production process of a composite material according to one example of the present invention.

FIG. 2 is a schematic diagram showing a production process of a composite material according to one example of the present invention. UV and ozone were sequentially treated on both sides of the plastic layer (10) formed of nylon 6 resin to introduce polar functional groups. The steel sheets (20, 30) were laminated on both sides of the plastic layer (10) onto which the polar functional groups were introduced. The lamination was performed under heating and pressurized conditions to produce a composite material in which the steel sheet (20), the plastic layer (10) and the steel sheet (30) were sequentially laminated.

MODE FOR INVENTION

Hereinafter, the present invention is further described in detail through examples and the like, but the scope of the present invention is not limited thereto.

Experimental Example 1

A plastic layer was formed using nylon 6 resin, and various functional groups were introduced onto the surface. A composite material was prepared by laminating the plastic layer onto which the functional groups were introduced and a steel sheet under heating and pressing conditions (Example).

A composite material was produced in the same method as in the above example, except that no separate surface modification was performed on the surface of the plastic layer. Instead, the composite material was produced by applying a commercially available one-component epoxy adhesive between the steel sheet and the plastic layer, and then performing a lamination process (Comparative Example).

Figure 3:
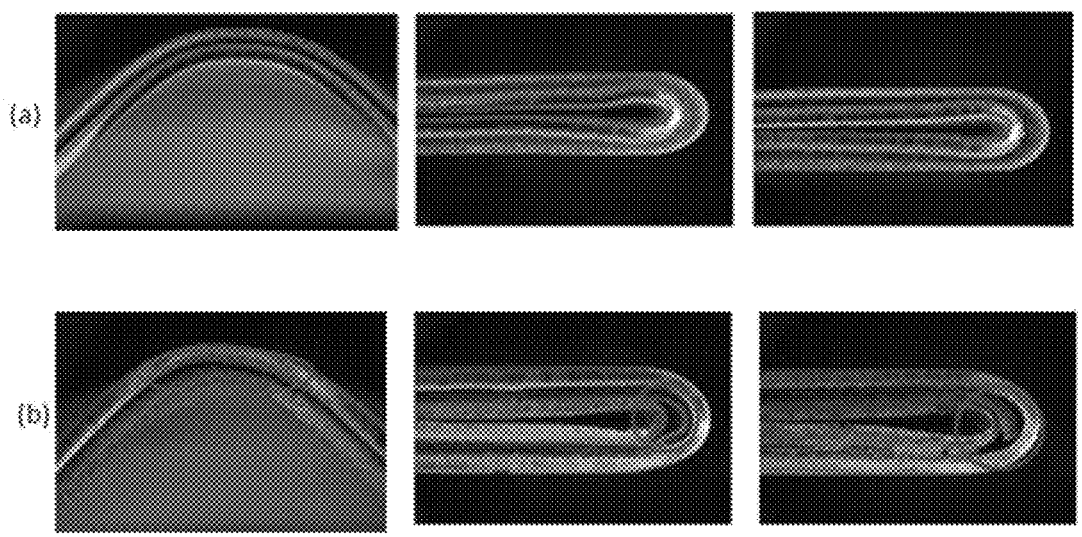
FIG. 3 are photographs of results of bending experiments of composite materials according to Examples and Comparative Examples.

For the composite material samples produced in Example and Comparative Example, respectively, experiments evaluating whether or not peeling occurred according to the degree of bending were performed. The results were shown in FIG. 3. FIG. 3(a) is photographs of bend evaluation results of a composite material sample according to Example. It can be seen from FIG. 3(a) that the peeling phenomenon does not occur between the steel sheet and the plastic layer even in the case of being bent at 180 degrees.

FIG. 3(b) is photographs of bend evaluation results of a composite material sample according to Comparative Example. In FIG. 3(b), a phenomenon that the steel sheet and the plastic layer were partially peeled off at the time of being bent at 60 degrees was observed. When the sample was bent to 180 degrees, a phenomenon that the peeling between the steel sheet and the plastic layer was observed at the bend portion or the plastic layer was broken was observed.

Experimental Example 2

A plastic layer was formed using nylon 6 resin, and various functional groups were introduced onto the surface. A composite material was prepared by laminating the plastic layer onto which the functional groups were introduced and a steel sheet under heating and pressing conditions (Example). A composite material was produced in the same method as in the above example, except that functional groups were introduced onto the surface of the steel sheet and no separate surface modification was performed on the surface of the plastic layer (Comparative Example).

For the respective composite material samples as produced, the bonding force was evaluated by measuring the force required to separate the steel sheet and the plastic layer. For each sample, the evaluation was repeatedly performed 10 times.

The types of the introduced functional groups and evaluation results were summarized in Table 1 below (unit MPa).

Referring to Table 1, it can be seen that the bonding force of Example in which the functional groups are introduced onto the surface of the plastic layer is remarkably superior to that of Comparative Example in which the functional groups are introduced onto the steel sheet. For example, the average value after 10 repeated experiments in the case of introducing —OH to the surface of the steel sheet is 6.8 MPa, but the average value of 10 times in the case of introducing the —OH group onto the surface of the plastic layer is about 19.2 MPa. In Example, the bonding force of about 2.8 times is improved as compared to Comparative Example. Even when other functional groups are introduced, it can be seen that Example has excellent bonding force of 2.5 times or more as compared to Comparative Example.

EXPLANATION OF REFERENCE NUMERALS

10: plastic layer
20, 30: steel sheet

INDUSTRIAL APPLICABILITY

The composite material according to the present invention introduces polar functional groups onto a surface of a plastic layer, thereby providing sufficient adhesion force between the steel sheet and the plastic layer and being capable of being used as automotive parts or automotive structures, and the like.

The invention claimed is:
1. A composite material comprising:
a plastic layer having a first surface, wherein polar functional groups are introduced onto the first surface of the plastic layer, and the polar functional group comprises: one or more of a hydroxy group (—OH), a carboxy group (—COOH), a carbonyl group (—CO—), an amino group (—NH$_2$), a hydroperoxy group (—OOH), a peroxy group (—OO—), a thiol group (—SH), and an isocyanate group (—NCO); and
a first steel sheet laminated on the first surface of the plastic layer, wherein the first steel sheet includes a surface in contact with the first surface of the plastic layer, and plastic particles are dispersed in the surface of the first steel sheet, and
wherein the plastic particles are formed of a homogeneous resin,
wherein the first steel sheet includes a plated layer formed on the surface of the first steel sheet,
the plastic particles are dispersed in a surface of the plated layer, and

TABLE 1

| | Lamination after surface treatment of steel sheet (Comparative Example) | | | | Lamination after surface treatment of plastic layer (Example) | | | |
|---|---|---|---|---|---|---|---|---|
| Division | —OH | —COOH | —NH$_2$ | —NCO | —OH | —COOH | —NH$_2$ | —NCO |
| 1 | 6.8 | 5.2 | 10.2 | 7.5 | 19.4 | 16.5 | 26.9 | 17.5 |
| 2 | 6.1 | 5.9 | 11.2 | 7.4 | 20.8 | 15.7 | 28.2 | 17.9 |
| 3 | 6.9 | 5.3 | 9.3 | 6.3 | 19.1 | 15.8 | 24.9 | 17.2 |
| 4 | 6.7 | 5.2 | 11.1 | 6.8 | 18.8 | 15.7 | 24.6 | 16.2 |
| 5 | 6.8 | 5.9 | 9.1 | 5.9 | 18.7 | 15.9 | 23.6 | 18.9 |
| 6 | 6.2 | 5.8 | 10.5 | 6.3 | 18.3 | 16.3 | 26.8 | 19.0 |
| 7 | 7.6 | 5.1 | 10.5 | 6.7 | 18.5 | 16.3 | 25.7 | 18.5 |
| 8 | 6.5 | 6.1 | 10.7 | 6.4 | 19.4 | 16.9 | 28.6 | 18.6 |
| 9 | 7.1 | 5.9 | 11.1 | 7.2 | 19.2 | 17.2 | 27.3 | 17.9 |
| 10 | 7.3 | 5.2 | 10.9 | 7.3 | 20.1 | 17.3 | 28.1 | 17.2 |
| Average | 6.8 | 5.6 | 10.5 | 6.8 | 19.2 | 16.4 | 26.5 | 17.2 | the surface of the plated layer has an arithmetic mean roughness (Ra) in a range of 0.01 μm to 5 μm.

2. The composite material according to claim 1, wherein the plastic layer is formed of an engineering plastic.

3. The composite material according to claim 1, wherein no separate adhesive layer is interposed between the plastic layer and the first steel sheet.

4. The composite material according to claim 1, wherein a thickness ratio of the plastic layer and the first steel sheet is in a range of 3:1 to 1:5.

5. The composite material according to claim 1, wherein the plastic particles have an average particle diameter in a range of 0.2 μm to 50 μm.

6. The composite material according to claim 1, further comprising: a second steel sheet laminated on a second surface of the plastic layer, the second surface of the plastic layer being opposite to the first surface of the plastic layer.

7. The composite material according to claim 1, wherein the composite material is an automotive material.

\* \* \* \* \*